United States Patent
Nagarajegowda et al.

(10) Patent No.: US 11,474,715 B2
(45) Date of Patent: Oct. 18, 2022

(54) STORAGE SYSTEM CONFIGURATION CHANGE TRACKING FOR ROOT CAUSE/TROUBLESHOOTING

(71) Applicant: EMC IP Holding Company LLC, Hopkinton, MA (US)

(72) Inventors: Deepak Nagarajegowda, Cary, NC (US); Bina Thakkar, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 46 days.

(21) Appl. No.: 17/077,411

(22) Filed: Oct. 22, 2020

(65) Prior Publication Data

US 2022/0129172 A1   Apr. 28, 2022

(51) Int. Cl.
| | |
|---|---|
| *G06F 3/00* | (2006.01) |
| *G06F 3/06* | (2006.01) |
| *G06K 9/62* | (2022.01) |
| *G06F 21/64* | (2013.01) |
| *G06F 21/62* | (2013.01) |

(52) U.S. Cl.
CPC .......... *G06F 3/0629* (2013.01); *G06F 3/0604* (2013.01); *G06F 3/0614* (2013.01); *G06F 3/0683* (2013.01); *G06F 21/6218* (2013.01); *G06F 21/64* (2013.01); *G06K 9/6215* (2013.01)

(58) Field of Classification Search
None
See application file for complete search history.

(56) References Cited

U.S. PATENT DOCUMENTS 10,185,509 B1 *   1/2019   Farhan ................. G06F 3/0652

* cited by examiner

*Primary Examiner* — Midys Rojas
(74) *Attorney, Agent, or Firm* — Amin, Turocy & Watson, LLP

(57) ABSTRACT

Architectures and techniques are described that can monitor or track change to storage system configuration. Changes to the configuration that are determined to be statistically significant in potentially affecting and/or causing performance issues of the storage system can be specifically tracked. Such can be accomplished by generating a hash data of the configuration data and sorting that hash data to data buckets based on a similarity score to other hash data of other storage systems.

20 Claims, 10 Drawing Sheets

STORAGE SYSTEM CONFIGURATION CHANGE TRACKING FOR ROOT CAUSE/TROUBLESHOOTING

TECHNICAL FIELD

The present application relates generally to the field of data storage and, more particularly, to tracking or monitoring changes made to storage system configuration.

BACKGROUND

Data center providers and other similar market actors seek to provide to customers high quality storage system products that have very few issues. Hence, when a customer does experience an issue with a storage system, it is very important to identify a root cause in order to determine a solution.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
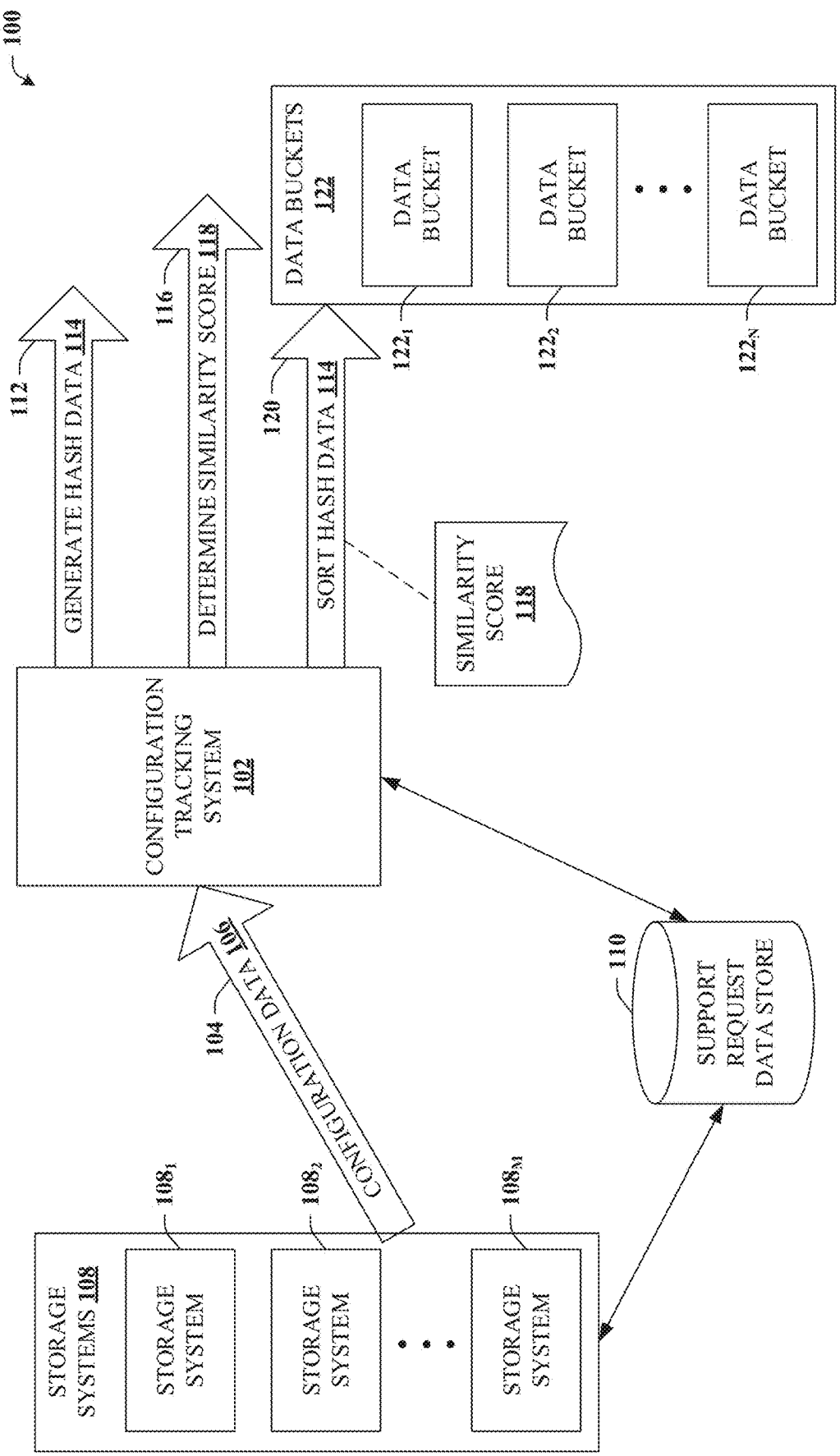
FIG. 1 illustrates a block diagram of an example system that can be configured to monitor and track storage system configuration changes in accordance with certain embodiments of this disclosure.

When a customer of a storage system product experiences an issue with the storage system, a typical response is to file a customer support request (SR). It typically takes significant manual effort by a support team in order to determine what went wrong with the storage system. The support team typically reviews very large amounts of data from many different potential sources, including storage system configuration data, system logs, and so on. In many cases, this process evolves into a trial and error process, particularly given that the support team may have access only to a subset of potentially relevant data or may not have time to thoroughly examine all potentially relevant data. Hence, the amount of time required to resolve a customer SR is on average about 26 days, representing an enormous amount of man-hours, costs, and potential customer dissatisfaction.

A significant number of storage system issues experienced by customers can be traced back to changes made to the configuration of the storage system. Frequently, issues arising from those configuration changes can lay dormant for several days or even weeks before the issue is noticed and a customer SR is filed. Such can add significant complexity to the support team's task of identifying a root cause of the issue.

Based on the above-noted factors, the disclosed subject matter can monitor and track changes to storage system configurations and can do so in an extremely efficient manner. This change tracking information can then be sorted in a unique way that can aid support teams in resolving a customer SR. For example, the sorted information can, in some embodiments, yield important clues as to the cause of the issue, as well as identify previously proven fixes or solutions. In some embodiments, a predictive model can identify the issue and propose a solution to the support team, which can save significant amounts of time and costs.

For example, using an historical SR database, systems proposed herein can identify storage system configuration parameters that typically lead to customer SR being filed. As an example, the relevant system configuration parameters can be identified as being statistically significant, e.g., based on a chi-squared test or similar. It is appreciated that different storage system types or classes can have different statistically significant configuration parameters, so the above can be performed for each type, class, or family of storage system.

Using the derived statistically significant configuration parameters, each individual storage system can be categorized into a given data bucket based on the value of those parameters. These data buckets can be sequentially ordered from 1-N and a similarly score assigned to the configuration data can be employed for sorting. Thus, storage systems with similar configuration parameters can be grouped together in the same bucket, whereas storage systems with increasingly dissimilar configurations can occupy increasingly distant buckets in the sequence.

In some embodiments, a change tracking model for statistically significant parameters can be generated for each storage system type. Further, a change tracking data store can be employed to store the similarity metrics for each of the configuration parameters for some period of time such as the last 15 days. Such can provide the ability for support personnel to quickly identify what change on a given day might have led to some other change in the storage system. In the event of a customer SR for a given storage system, other storage systems occupying the same bucket (e.g., those that had previous SR reported) can provide valuable clues as to the nature of the issue as well as a potential solution.

In some embodiments, using supervised data sets, a predicative model can be trained to identify which configuration parameters might lead to a significant change. Such can allow the system to identify a root cause of the issue relating to a configuration parameter change.

Example Systems

Referring now to FIG. 1, a block diagram of an example system 100. System 100 can be configured to monitor and track storage system configuration changes in accordance with certain embodiments of this disclosure. System 100 can comprise configuration tracking system 102. Generally, configuration tracking system 102 (and other systems, components, or devices detailed herein) can comprise a processor and a memory that stores executable instructions that, when executed by the processor, facilitate performance of operations. Examples of the memory and processor can be found with reference to FIG. 10. It is to be appreciated that the computer 1002 can represent a server device or a client device and can be used in connection with implementing one or more of the systems, devices, or components shown and described in connection with FIG. 1 and other figures disclosed herein.

Configuration tracking system 102 can be configured to receive (illustrated at reference numeral 104) configuration data 106 that has been determined to be statistically significant according to a significance criterion. Configuration data 106 can be indicative of a configuration of one or more storage systems 108. Each storage system can have many hundreds of different configuration parameters. However, it is appreciated that configuration data 106 can include only those configuration parameters that have been determined to be statistically significant. A few examples of configuration parameters of a storage system can be a firmware version of given drive or other equipment, a number of drives or other equipment, a drive or equipment type (e.g., hard disk drive, solid state drive, etc.), RAID type, and so forth. Additional examples of various configuration parameters are provided with reference to FIG. 3.

In some embodiments, the determination of which configuration parameters are statistically significant can be determined according to the significant criterion in response to an examination of a support request data store 110. Support request data store 110 can store information relating to issues that have arisen for a group of storage systems $108_1$-$108_M$, where M is any suitable positive number. In some embodiments, configuration data 106 can be determined to be statistically significant according to the significance criterion in response to a chi-squared test procedure applied to the information of support request data store 110. As noted previously, configuration data 106 can differ for each type or class of storage system 108. Thus, different sets of configuration parameters might be found to be statistically significant (and therefore be included in configuration data 106) for different types of storage systems.

As illustrated at reference numeral 112, configuration tracking system 102 can be configured to generate hash data 114. Hash data 114 can comprise hashing configuration data 106. In some embodiments, generating hash data 114 can comprise generating multiple hash signatures comprising a hash signature for each of multiple columns of configuration data. In other words, each configuration parameter can be assigned to an individual hash signature, which is further detailed in connection with FIG. 3. In some embodiments, hash data 114 can be a result of hashing configuration data 106 according to a min-hash function, which is further discussed in connection with FIG. 5.

As illustrated at reference numeral 116, configuration tracking system 102 can be configured to determine similarity score 118 associated with hash data 114. Similarity score 118 can represent a similarity to other hash data other than hash data 114 (e.g., similarly generated hash data for other storage systems 108).

As illustrated at reference numeral 120, configuration tracking system 102 can be configured to sort hash data 114. For example, hash data 114 can be sorted into one of a group of data buckets 122 (e.g., $122_1$-$122_N$, where N can be any suitable positive number) based on similarity score 118. For instance, suppose similarity score 118 is very similar to other hash data of other storage systems that were previously sorted to data bucket $122_1$, but very dissimilar that sorted to data bucket $122_N$. In that case, hash data 114 can be sorted to data bucket $122_1$.

Figure 2:
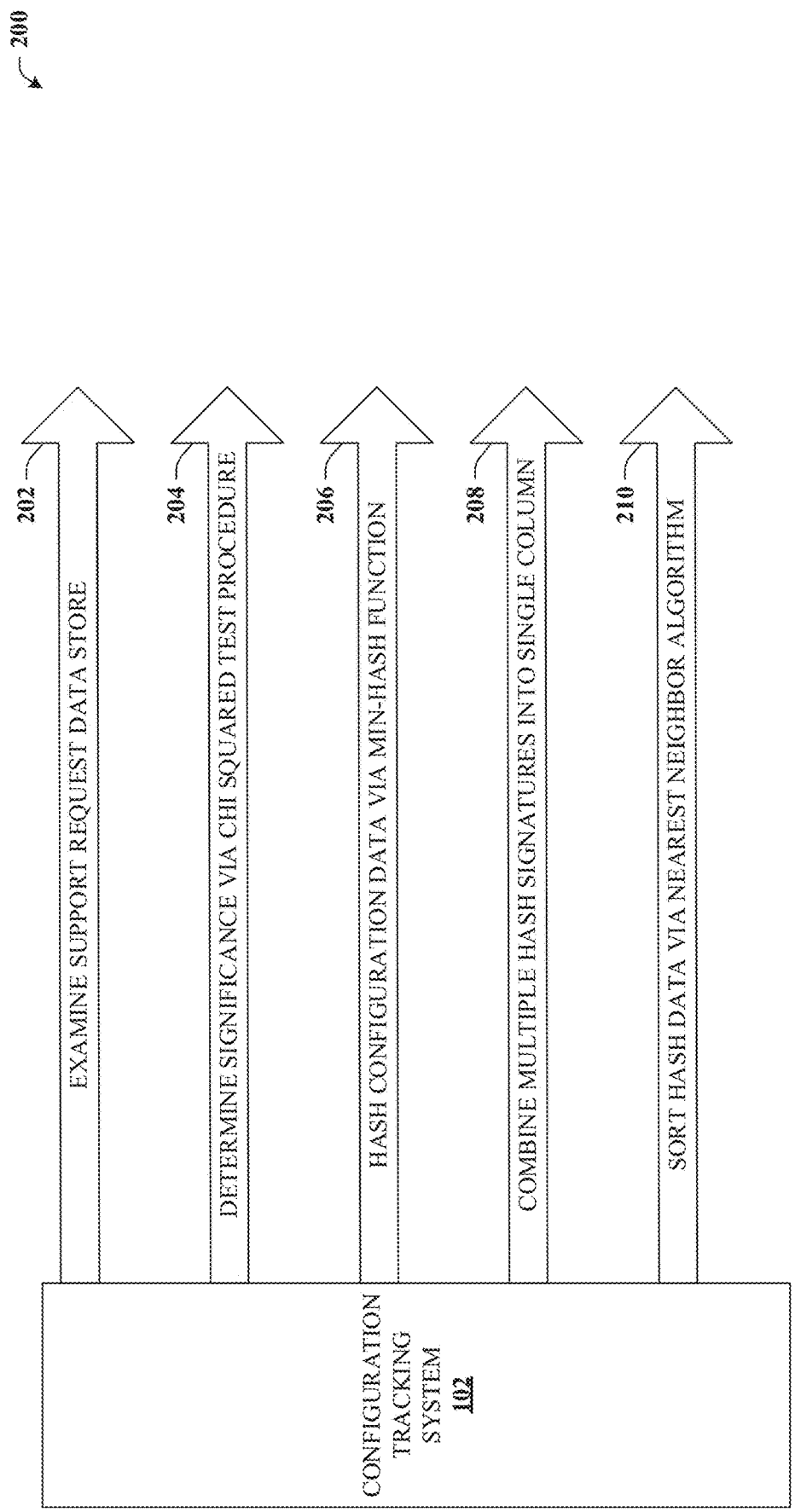
FIG. 2 depicts a block diagram of an example system that can be configured to provide for additional aspects or elements in connection with monitoring and tracking storage system configuration changes in accordance with certain embodiments of this disclosure.

Referring now to FIG. 2, block diagram 200 is depicted. System 200 can be configured to provide for additional aspects or elements in connection with monitoring and tracking storage system configuration changes in accordance with certain embodiments of this disclosure. At reference numeral 202, configuration tracking system 102 can be configured to examine support request data store 110. For example, such can be done in order to determine a statistical significance of a given configuration parameter in terms of being a root cause of a potential issue with the storage system. In some embodiments, the statistical significance can be determined based on a chi-squared test procedure, as indicated at reference numeral 204. Configuration parameters that are determined to be statistically significant can be included in configuration data 106.

In some embodiments, configuration tracking system 102 can be configured to hash configuration data 106. As an example, each configuration parameter can be hashed as a separate signature. As illustrated at reference numeral 206, configuration data 106 can be hashed according to a min-hash function, which is further detailed in connection with FIG. 5 below.

At reference numeral 208, the multiple hash signatures, e.g., one for each of the statistically significant configuration parameters included in the configuration data 106, can be combined or concatenated by configuration tracking system 102. In other words, the data structure that stores this combined hash can comprise only two columns, namely a time stamp column indicative of a time that hashing data 114 was generated and a combined hash column indicative of a concatenation of the multiple hash signatures. By reducing this data structure from potentially dozens or even hundreds of columns down to only one containing configuration information, comparisons as well as sorting can be much faster or otherwise much more efficient.

At reference numeral 210, configuration tracking system 102 can sort hash data 114 into the appropriate data bucket 122 based on the similarity score 118. In some embodiments, such can be performed according to a nearest neighbor algorithm that, e.g., finds a nearest similarity score among other hash data in order to determine the appropriate data bucket 122. Both hash data 114 and similarity score 118 can be maintained for subsequent analysis.

Figure 3:
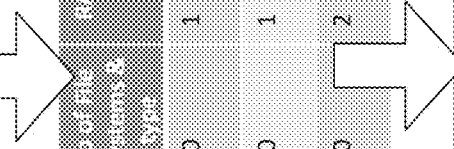
FIG. 3 is a tabular illustration that depicts example transformations of the configuration data into hash data in accordance with certain embodiments of this disclosure.

Turning now to FIG. 3, illustration 300 is depicted. Illustration 300 depicts example transformations of configuration data 106 into hash data 114 in accordance with certain embodiments of this disclosure. Illustration 300 depicts three different versions of configuration data 106 in various states according to some embodiments of this disclosure. As shown by table 302, initially configuration data 302 is in a raw form, for instance, information received from polling the storage system. Table 302 comprises a time stamp indicative of when the information was collected, which can represent a time of generation of hash data 114 (shown in table 306).

As explained previously, table 302 can further comprise numerous configuration parameters (e.g., one per column) that have been determined to be statistically significant for the given type of storage system being examined. As shown, configuration data 106 in the raw form can include substantially any alphanumeric character (e.g., both numbers and letters). One potential issue with such is that comparisons on data including letters can be more expensive or more time-consuming.

Hence, as depicted at table 304, the information of table 302 can be transformed to a different state such that all information is stored in numeric form. For example, in the "RAID type" column, the term "RAID5" existing in the first two records of table 302 can be converted to "1" in table 304, whereas the term "RAID6" is converted to "2". Such can be accomplished by reference to a dictionary that can be generated by configuration tracking system 102, potentially on the fly, or can be pre-existing.

Table 306 illustrates an example of the same three records shown in tables 302 and 304, but in a third state in which each of the configuration parameters have been hashed to individual signatures. Again using the "RAID type" column, the term "RAID5" indicative of raw configuration data 106 found in table 302 has a corresponding hash signature of "0100100". As already mentioned, by hashing configuration data 106, various efficiencies can be realized, as further detailed in connection with FIG. 4.

Figure 4:
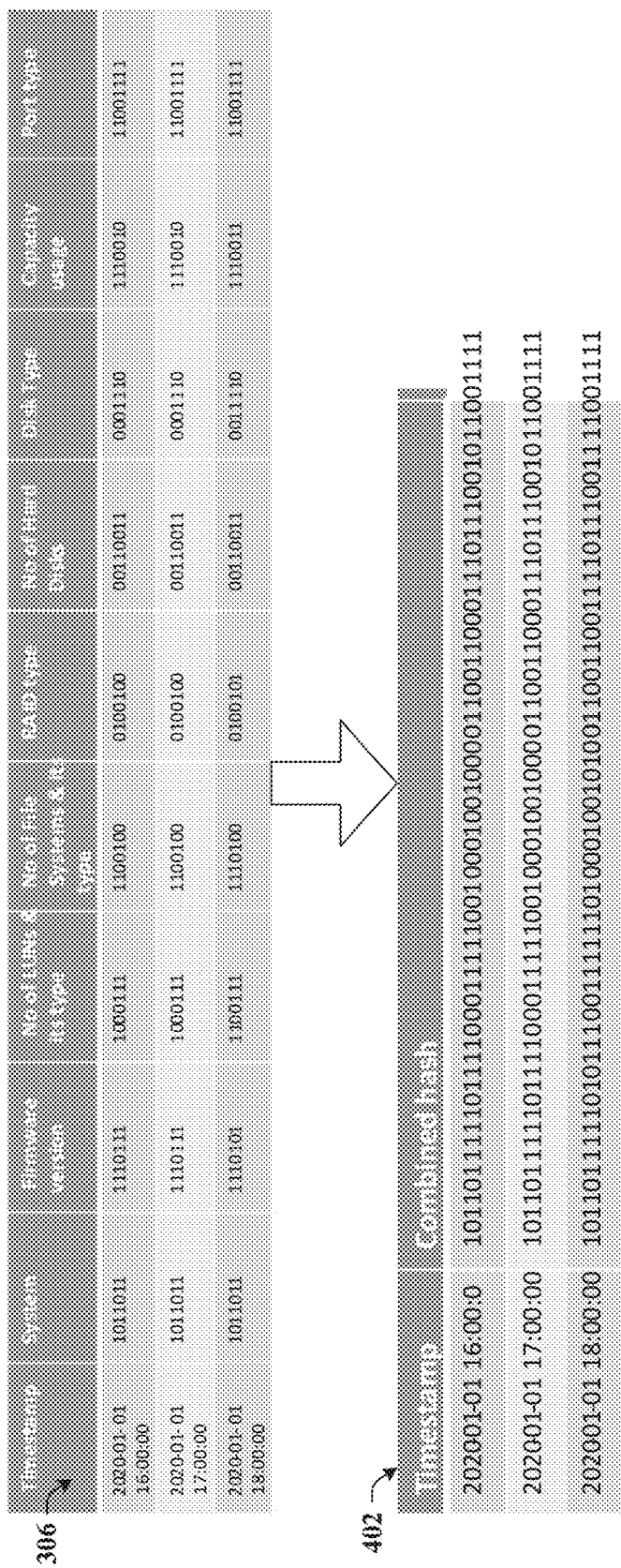
FIG. 4 is a tabular illustration that depicts an example combination or concatenation of the individual hash signatures to a combined hash in accordance with certain embodiments of this disclosure.

With reference now to FIG. 4, illustration 400 is depicted. Illustration 400 depicts an example combination or concatenation of the individual hash signatures to a combined hash in accordance with certain embodiments of this disclosure. Illustration 400 depicts this transformation from table 306 to table 402. It is appreciated that table 402 includes only two columns, whereas the raw data and other examples of FIG. 3 (e.g., tables 302, 304, and 306) include many more columns. By reducing the number of columns, comparisons performed in order to determine similarity score 118 and so forth can be significantly faster or more efficient, particularly over similar comparisons that endeavor to compare alphanumeric data such as the term "RAID5", for instance. It is further appreciated that a data structure that stores hash data 114 can be in the form shown in table 402 (e.g., two columns), but may also in some cases be representative of individual signatures illustrated in table 306.

Figure 5:
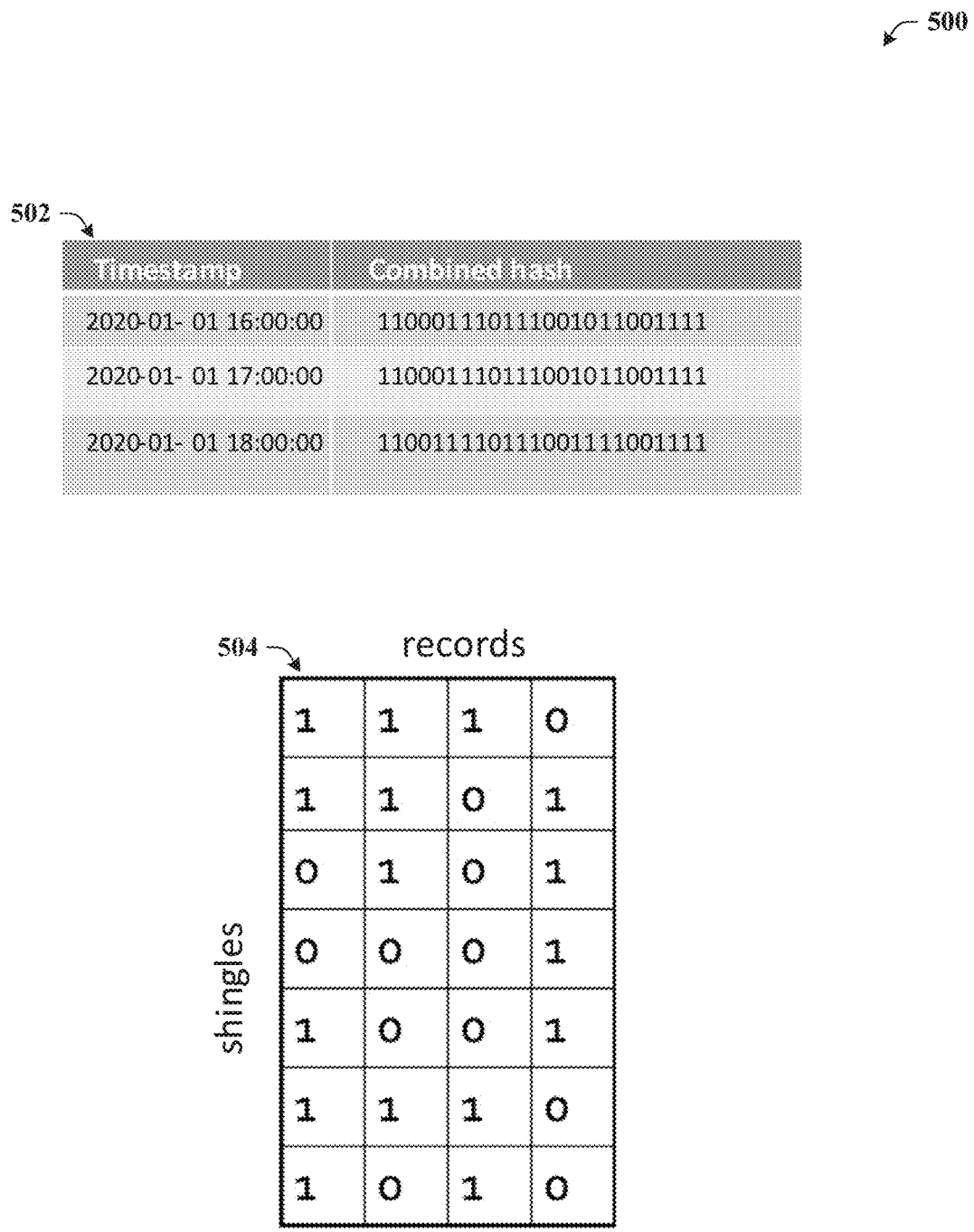
FIG. 5 is a tabular illustration that depicts an example of a min-hash technique in accordance with certain embodiments of this disclosure.

Turning now to FIG. 5, illustration 500 is depicted. Illustration 500 depicts an example of a min-hash technique in accordance with certain embodiments of this disclosure. Illustration 500 depicts an example of hash data 114 in table 502 and a min-hash comparison between records in table 504. It is understood that the concept of hashing is to convert some unit of data (e.g., a record or column entry) into a small signature using a given hashing function, H. Suppose a record in the corpus is denoted by d. Then, the following can be advantageous. H(d) is the signature and that signature is small enough to fit in memory. If similarity (d1, d2) is high, then Probability(H(d1)==H(d2)) is also high. Conversely, If similarity (d1, d2) is low, then Probability(H(d1)==H(d2)) is also low.

The choice of the particular hashing function can be tightly linked to the similarity metric (e.g., similarity score 118) introduced herein. For Jaccard similarity, an appropriate hashing function can be the min-hash function. Illustration 500 conceptually depicts a min-hash function on the term "RAID5", which is used for easy of understanding, even though it is noted that similarity comparisons will typically use only numerals, as detailed above. Relying on two shingles, the term "RAID5" can be separated into four parts, which are "RA", "AI", "ID", and "D5". It is noted that the more shingles two records have in common, the more similarly the two are (e.g., higher similarity score 118). A k value of 8-10 is generally used in practice. It is possible that a smaller value will result in many more shingles, which are present in most of the records. Thus, such could be undesirable for differentiating records.

Figure 6:
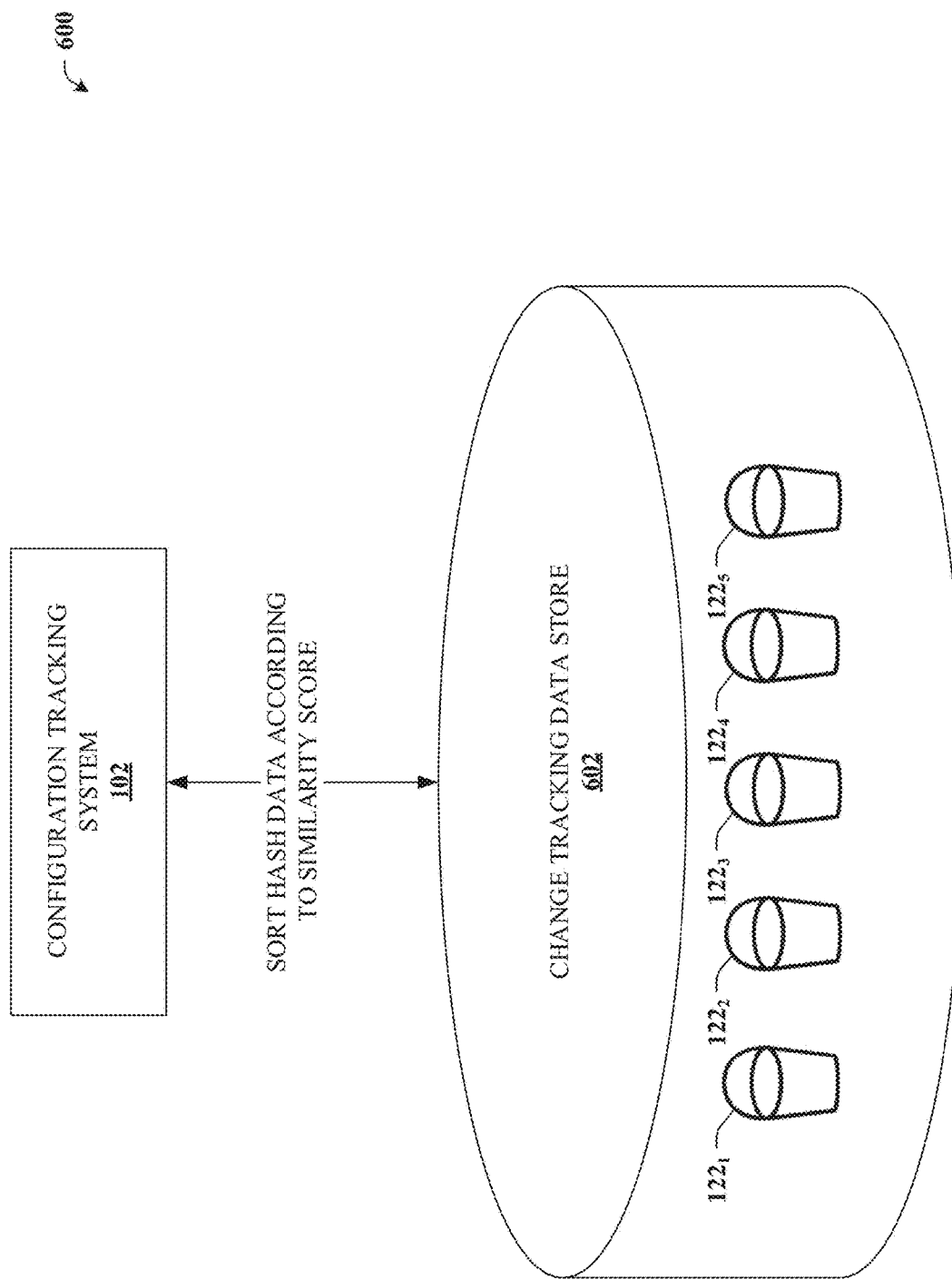
FIG. 6 depicts a block diagram of an example system illustrating a configuration tracking system sorting the hash data into a change tracking data store according to a similarity score in accordance with certain embodiments of this disclosure.

Turning now to FIG. 6, system 600 is depicted. System 600 illustrates configuration tracking system 102 sorting hash data 114 into a change tracking data store 602 according to similarity score 118 in accordance with certain embodiments of this disclosure. It is noted that a given storage system can be polled or audited for raw configuration parameters at intervals such as every hour, every day, or some other time. Each time, such occurs, those configuration parameters can be converted to a distinct record of hash data 114, each with its own time stamp.

Each of these records can be independently sorted to a given data bucket 122, which can be included in the change tracking data store 602. As such, the data and timing aspects of information in change tracking data store can be very useful to aid in troubleshooting or otherwise reacting to a customer SR. For example, in some embodiments, a predictive model can be trained from hash data 114 stored in change tracking data store 602. The predictive model can be configured to identify a significant change to the configuration of the storage system between a first time and a second time. For instance, suppose a first hash record (timestamp=$t_1$) is sorted, based on similarity score 118, into data bucket $122_1$, whereas a subsequent hash record (timestamp=$t_2$) of the same storage system is sorted into data bucket $122_5$.

Such can indicate that configuration parameters of that particular storage system have changed significantly between $t_1$ and $t_2$, which can raise a red flag or at least indicate further monitoring or analysis is warranted. For instance, if at some later time the storage system begins to have issues, the ability to readily review historical bucket placement can be very advantageous.

As another example, suppose hash data 114 is currently sorted to data bucket $122_3$. If an issue arises with the associated storage system, then data bucket $122_3$, can be examined to identify other storage systems with similar configuration parameters. If, in the past, one of those storage system was the subject of a SR (at the time of being in data bucket $122_3$), then such can be very useful in troubleshooting the underlying issue, and may even have a solution already discovered.

Accordingly, in some embodiments, configuration tracking system 102 can determine that a SR has been received in connection with the subject storage system. In response, configuration tracking system 102 can facilitate presentation (e.g., via instructions to a user interface or display) an indication of a previous support request associated with the other storage system that has hash data sorted to the same data bucket 122. Further, in the case where a substantial change to the configuration is detected (e.g., in response to associated hash data 114 being sorted to a markedly different data bucket 122), configuration tracking system 102 can facilitate presentation of the substantial change.

Example Methods

Figure 7:
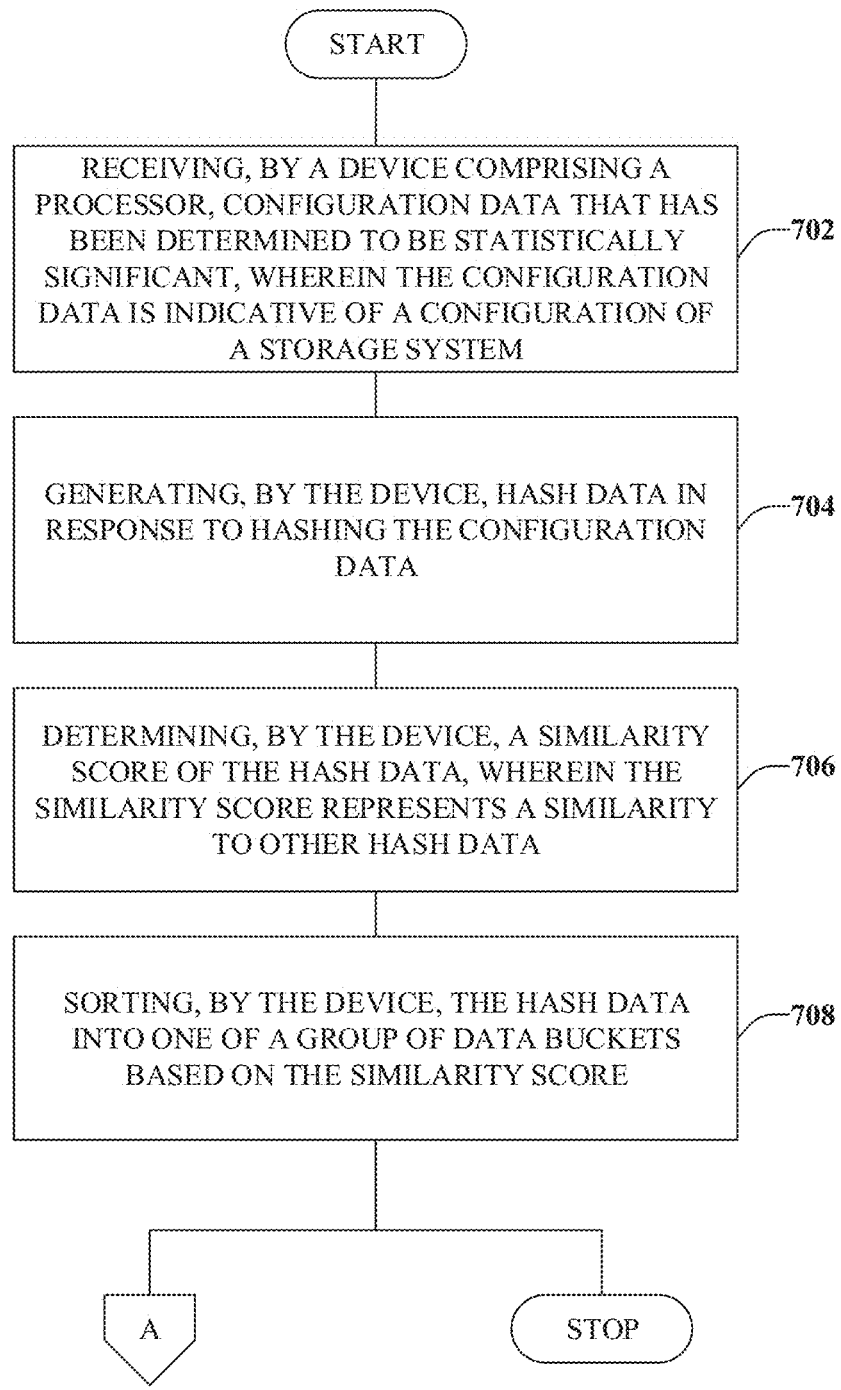
FIG. 7 illustrates an example method that can monitor and track storage system configuration changes in accordance with certain embodiments of this disclosure.
Figure 8:
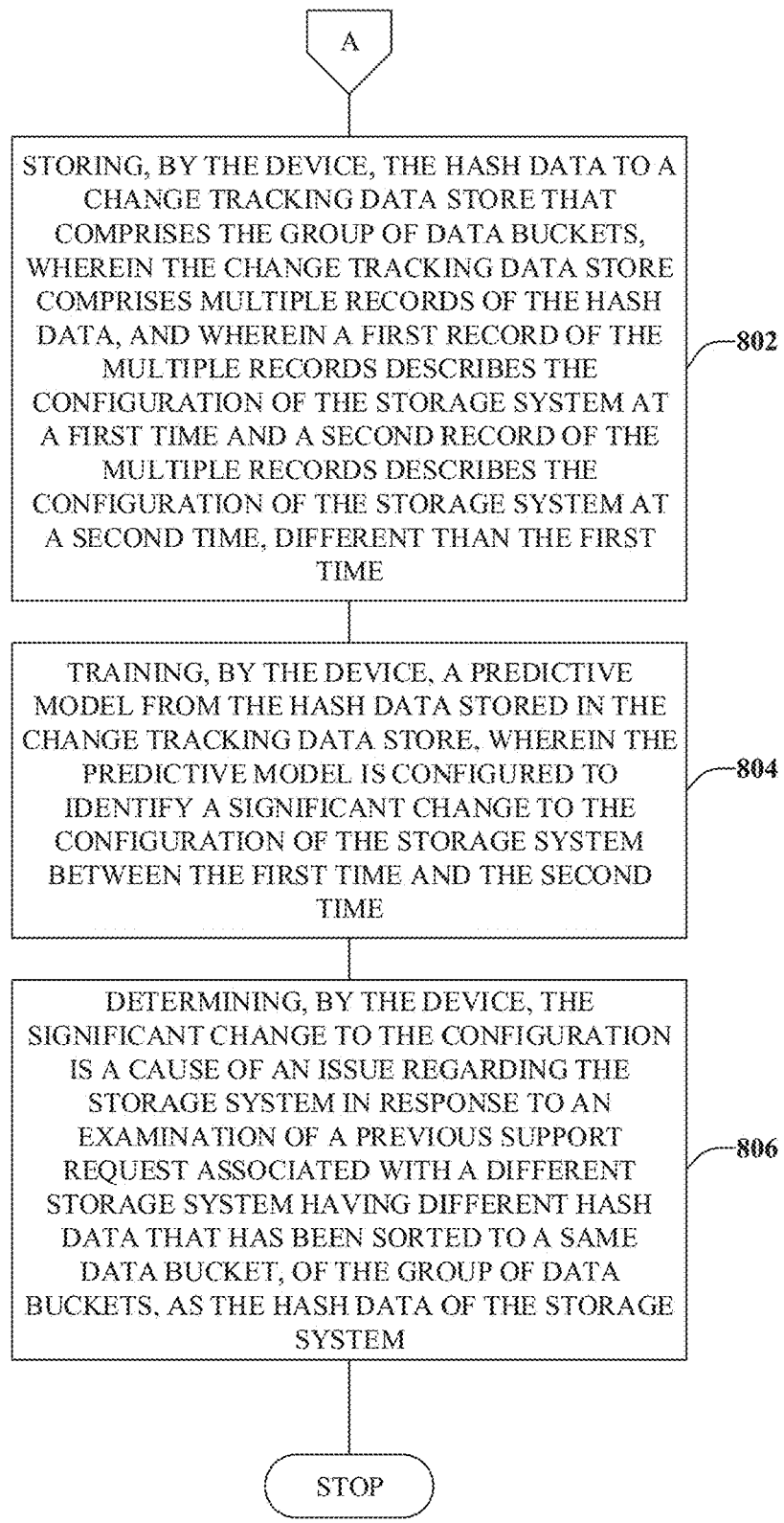
FIG. 8 illustrates an example method that can provide for additional aspect or elements in connection with the monitoring and tracking of storage system configuration changes in accordance with certain embodiments of this disclosure.

FIGS. 7 and 8 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Referring now to FIG. 7, exemplary method 700 is depicted. Method 700 can monitor and track storage system configuration changes in accordance with certain embodiments of this disclosure. While method 700 describes a complete method, in some embodiments, method 700 can include one or more elements of method 800, as illustrated by insert A.

At reference numeral 702, a device comprising a processor can receive configuration data that has been determined to be statistically significant. The configuration data can be indicative of a configuration of a storage system such as a type and number of drives, a current firmware version, and so forth.

At reference numeral 704, the device can generate hash data in response to hashing the configuration data. In some embodiments, raw configuration data can be converted to numerical values (e.g., employing a defined dictionary). Further, each configuration parameter can be independently hashed, and those independently hashed signatures can be concatenated or otherwise combined into a single column.

At reference numeral 706, the device can determine a similarity score of the hash data. The similarity score can represent a similarity to other hash data associated with other storage systems. At reference numeral 708, the device can sort the hash data into one of a group of data buckets based on the similarity score. Hence, such sorting of the hash data effectively groups storage systems by similarity of configuration. Method 700 can terminate or continue to insert A, which is further detailed in connection with FIG. 8.

Turning now to FIG. 8, exemplary method 800 is depicted. Method 800 can provide for additional aspect or elements in connection with the monitoring and tracking of storage system configuration changes in accordance with certain embodiments of this disclosure.

At reference numeral 802, the device introduced at reference numeral 702 comprising a processor can store the hash data to a change tracking data store that comprises the group of data buckets. The change tracking data store can comprises multiple records of the hash data. For example, a first record of the multiple records can describe the configuration of the storage system at a first time while a second record of the multiple records can describe the configuration of the storage system at a second time, different than the first time.

At reference numeral 804, the device can train a predictive model from the hash data stored in the change tracking data store. The predictive model can be configured to identify a significant change to the configuration of the storage system between the first time and the second time.

At reference numeral 806, the device can determine the significant change to the configuration is a cause of an issue regarding the storage system. For example, such can be accomplished in response to an examination of a previous support request associated with a different storage system having different hash data that has been sorted to a same data bucket, of the group of data buckets, as the hash data of the storage system.

Example Operating Environments

Figure 9:
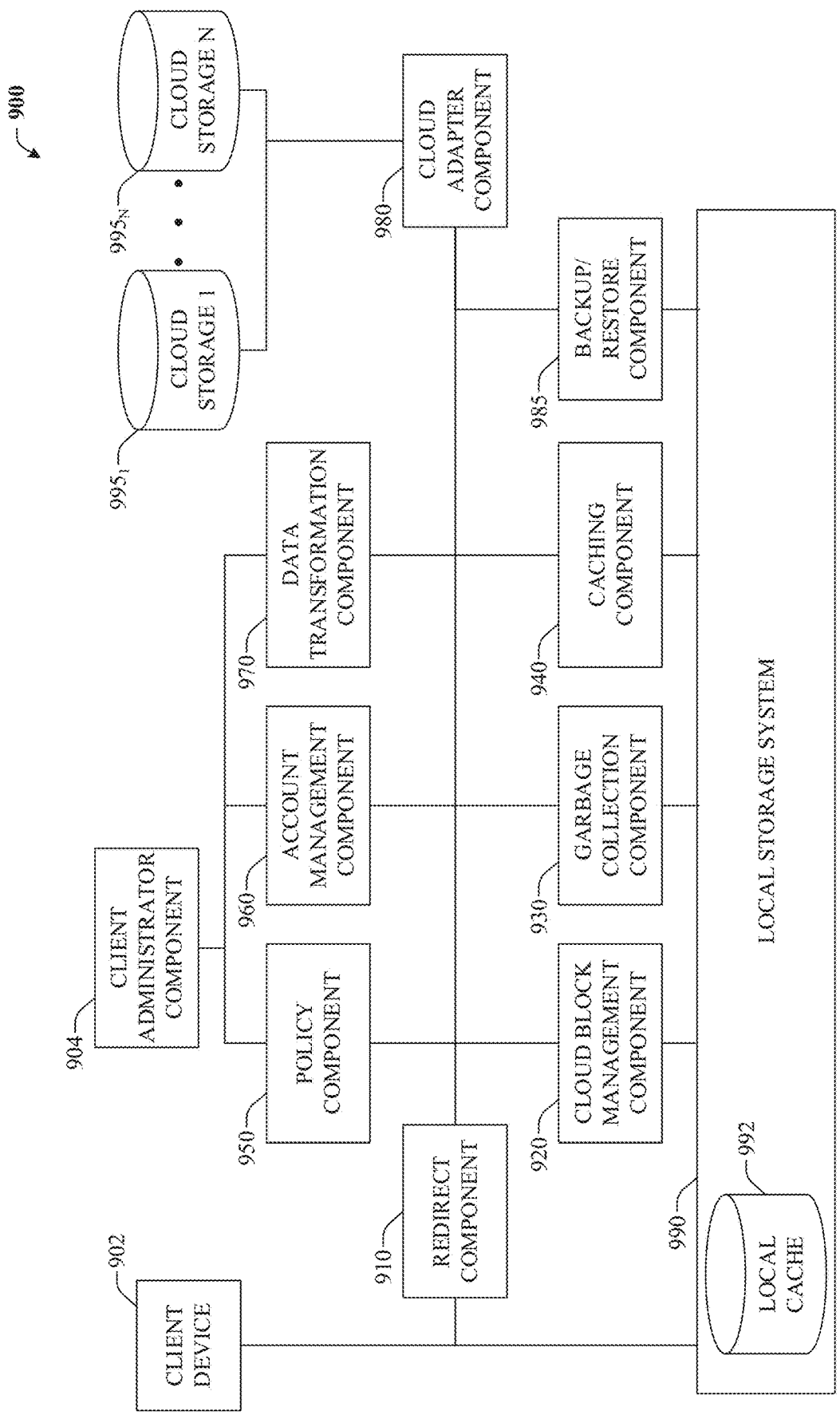
FIG. 9 illustrates a block diagram of an example distributed file storage system that employs tiered cloud storage in accordance with certain embodiments of this disclosure.
Figure 10:
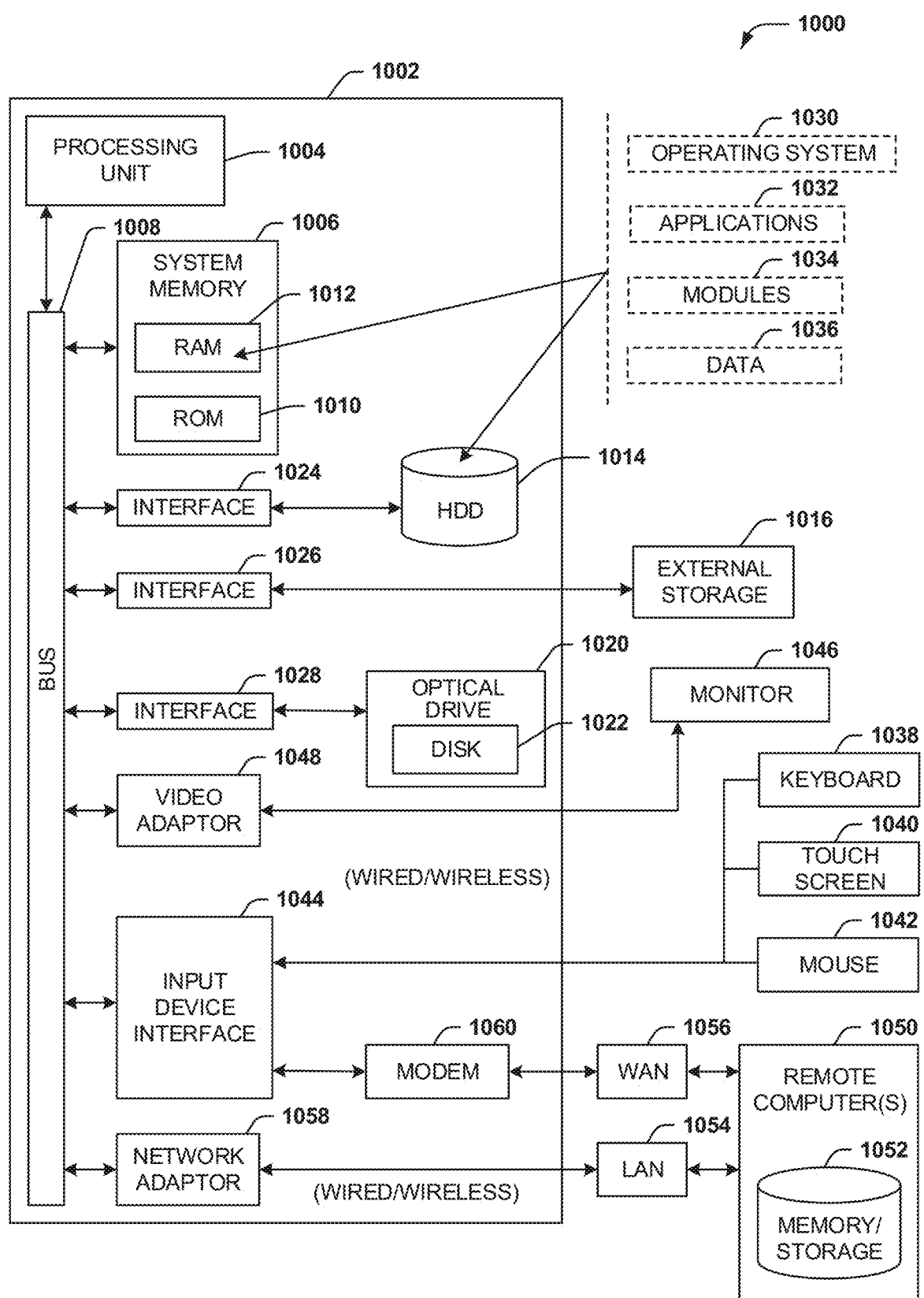
FIG. 10 illustrates an example block diagram of a computer operable to execute certain embodiments of this disclosure.

To provide further context for various aspects of the subject specification, FIGS. 9 and 10 illustrate, respectively, a block diagram of an example distributed file storage system 900 that employs tiered cloud storage and block diagram of a computer 1002 operable to execute the disclosed storage architecture in accordance with aspects described herein.

Referring now to FIG. 9, there is illustrated an example local storage system including cloud tiering components and a cloud storage location in accordance with implementations of this disclosure. Client device 902 can access local storage system 990. Local storage system 990 can be a node and cluster storage system such as an EMC Isilon Cluster that operates under OneFS operating system. Local storage system 990 can also store the local cache 992 for access by other components. It can be appreciated that the systems and methods described herein can run in tandem with other local storage systems as well.

As more fully described below with respect to redirect component 910, redirect component 910 can intercept operations directed to stub files. Cloud block management component 920, garbage collection component 930, and caching component 940 may also be in communication with local storage system 990 directly as depicted in FIG. 9 or through redirect component 910. A client administrator component 904 may use an interface to access the policy component 950 and the account management component 960 for operations as more fully described below with respect to these components. Data transformation component 970 can operate to provide encryption and compression to files tiered to cloud storage. Cloud adapter component 980 can be in communication with cloud storage 1 and cloud storage N, where N is a positive integer. It can be appreciated that multiple cloud storage locations can be used for storage including multiple accounts within a single cloud storage location as more fully described in implementations of this disclosure. Further, a backup/restore component 997 can be utilized to back up the files stored within the local storage system 990.

Cloud block management component 920 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete Mode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 920 in chunks of data. A uniform chunk size can be selected where all files that tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 960 manages the information for cloud storage accounts. Account information can be populated manually via a user interface provided to a user or administer of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 920 based on list of mappings it manages. For example, each stub can be associated with an account, and the cloud block management component 920 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 980 manages the sending and receiving of data to and from the cloud service providers. The cloud adapter component 980 can utilize a set of APIs. For example, each cloud service provider may have provider specific API to interact with the provider.

A policy component 950 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 930. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 930 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 940 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 920, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 940 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 940 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 970 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 997 can transfer a copy of the files within the local storage system 990 to another cluster (e.g., target cluster). Further, the backup/restore component 997 can manage synchronization between the local storage system 990 and the other cluster, such that, the other cluster is timely updated with new and/or modified content within the local storage system 990.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1002.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        receiving configuration data comprising configuration parameters, of a storage system, that have been determined to be significant, according to a significance criterion, with respect to correcting a first previous storage system issue;
        generating hash data comprising hashing the configuration data;
        determining a similarity score associated with the hash data, wherein the similarity score represents a similarity to other hash data other than the hash data, that was hashed with respect to a second previous storage system issue; and
        sorting the hash data into one of a group of data buckets based on the similarity score.

2. The system of claim 1, wherein the configuration data is determined to be significant according to the significance criterion in response to an examination of a support request data store that stores information relating to issues, comprising the first previous storage system issue and the second previous storage system issue, that have arisen for a group of storages systems comprising the storage system.

3. The system of claim 2, wherein the configuration data is determined to be significant according to the significance criterion in response to a chi-squared test procedure applied to the information of the support request data store.

4. The system of claim 1, wherein the hashing of the configuration data comprises hashing the configuration data according to a min-hash function.

5. The system of claim 1, wherein the generating of the hash data comprises generating multiple hash signatures comprising a hash signature for each of multiple columns of the configuration data.

6. The system of claim 5, wherein the hash data is stored to a data structure comprising a time stamp column indicative of a time that the hash data was generated and a combined hash column indicative of a concatenation of the multiple hash signatures.

7. The system of claim 1, wherein the sorting of the hash data into one of the group of data buckets comprises sorting the hash data according to a nearest neighbor algorithm.

8. The system of claim 1, wherein the operations further comprise storing the hash data to a change tracking data store that comprises the group of data buckets, wherein the change tracking data store comprises multiple records of the hash data, and wherein a first record of the multiple records describes the configuration parameters of the storage system at a first time and a second record of the multiple records describes the configuration parameters of the storage system at a second time, different than the first time.

9. The system of claim 8, wherein the operations further comprise training a predictive model from the hash data stored in the change tracking data store, and wherein the predictive model is configured to identify a substantial change to a parameter of the configuration parameters of the storage system between the first time and the second time.

10. The system of claim 9, wherein the predictive model is further configured to determine the substantial change to the parameter is a cause of an issue regarding the storage system in response to an examination of a previous support request associated with a different storage system having different hash data that has been sorted to a same data bucket, of the group of data buckets, as the hash data of the storage system.

11. The system of claim 10, wherein the operations further comprise:
determining that a support request has been received in connection with the storage system, wherein the support request indicates an issue associated with operation of the storage system; and
presenting an indication of the previous support request.

12. The system of claim 10, wherein the operations further comprise:
determining that a support request has been received in connection with the storage system, wherein the support request indicates an issue associated with operation of the storage system;
determining that the substantial change to the parameter of the storage system that is identified by the predictive model has resulted in the hash data associated with the storage system being sorted to a different one of the group of buckets than previously sorted; and
presenting an indication of the substantial change.

13. A non-transitory computer-readable medium comprising instructions that, in response to execution, cause a system comprising a processor to perform operations, comprising:

receiving configuration data that has been determined to be significant with respect to a first storage system issue that has previously arisen, wherein the configuration data is indicative of a configuration of a storage system;
generating hash data as a result of hashing the configuration data;
determining a similarity score for the hash data, wherein the similarity score represents a similarity to other hash data that was hashed with respect to a second storage system issue that arose; and
sorting the hash data into one of a group of data buckets based on the similarity score.

14. The non-transitory computer-readable medium of claim 13, wherein the configuration data is determined to be significant in response to an examination of a support request data store that stores information relating to issues, comprising that first storage system issue and the second storage system issue, that have arisen for a group of storages systems comprising the storage system.

15. The non-transitory computer-readable medium of claim 13, wherein the configuration data is determined to be significant in response to a chi squared test procedure applied to the information of the support request data store.

16. The non-transitory computer-readable medium of claim 13, wherein the hashing the configuration data comprises hashing the configuration data according to a min-hash function.

17. A method, comprising:
receiving, by a device comprising a processor, configuration data that has been determined to be significant with respect to a first storage system issue that has arisen, wherein the configuration data is indicative of a configuration of a storage system;
generating, by the device, hash data in response to hashing the configuration data;
determining, by the device, a similarity score of the hash data, wherein the similarity score represents a similarity to other hash data, that was hashed with respect to a second storage system issue that has arisen; and
sorting, by the device, the hash data into one of a group of data buckets based on the similarity score.

18. The method of claim 17, further comprising storing, by the device, the hash data to a change tracking data store that comprises the group of data buckets, wherein the change tracking data store comprises multiple records of the hash data, and wherein a first record of the multiple records describes the configuration of the storage system at a first time and a second record of the multiple records describes the configuration of the storage system at a second time, different than the first time.

19. The method of claim 17, further comprising training, by the device, a predictive model from the hash data stored in the change tracking data store, wherein the predictive model is configured to identify a significant change to the configuration of the storage system between the first time and the second time.

20. The method of claim 17, further comprising determining, by the device, the significant change to the configuration is a cause of an issue regarding the storage system in response to an examination of a previous support request associated with a different storage system having different hash data that has been sorted to a same data bucket, of the group of data buckets, as the hash data of the storage system.

* * * * *